(12) United States Patent  
Arellano et al.

(10) Patent No.: US 9,079,273 B2
(45) Date of Patent: Jul. 14, 2015

(54) METHODS FOR MANUFACTURING, MODIFYING, AND RETROFITTING A GAS TURBINE INJECTOR

(75) Inventors: Leonel Arellano, Poway, CA (US); James Scott Piper, Bonita, CA (US)

(73) Assignee: Solar Turbines Incorporated, San Diego, CA (US)

( * ) Notice: Subject to any disclaimer, the term of this patent is extended or adjusted under 35 U.S.C. 154(b) by 475 days.

(21) Appl. No.: 13/471,077

(22) Filed: May 14, 2012

(65) Prior Publication Data

US 2013/0298368 A1   Nov. 14, 2013

(51) Int. Cl.
 *B23P 6/00* (2006.01)

(52) U.S. Cl.
 CPC .............. *B23P 6/005* (2013.01); *B23P 2700/13* (2013.01); *F23R 2900/00019* (2013.01); *Y10T 29/49748* (2015.01)

(58) Field of Classification Search
 CPC ........ B23P 6/00; B23P 6/005; B23P 2700/13; Y10T 29/49748; F23R 2900/00019
 USPC ................. 29/889.1, 402.01, 402.07, 402.03, 29/402.19; 60/737, 740, 742, 748
 See application file for complete search history.

(56) References Cited

U.S. PATENT DOCUMENTS

| | | | |
|---|---|---|---|
| 4,358,658 A | 11/1982 | Van Blarigan et al. | |
| 4,644,127 A | 2/1987 | La Rocca | |
| 4,833,295 A * | 5/1989 | Locker et al. | 219/121.63 |
| 4,868,365 A * | 9/1989 | Farone et al. | 219/121.64 |
| 5,168,142 A * | 12/1992 | Gartner et al. | 219/121.64 |
| 5,404,711 A | 4/1995 | Rajput | |
| 6,269,540 B1 * | 8/2001 | Islam et al. | 29/889.7 |
| 6,573,472 B1 | 6/2003 | Waffenschmidt | |
| 6,939,083 B2 * | 9/2005 | Tosi et al. | 405/170 |
| 7,862,295 B2 * | 1/2011 | Daguenet | 415/191 |
| 7,966,707 B2 | 6/2011 | Szela et al. | |
| 8,122,721 B2 * | 2/2012 | Johnson et al. | 60/742 |
| 2008/0066720 A1 | 3/2008 | Piper et al. | |
| 2010/0107653 A1 * | 5/2010 | Paskevich et al. | 60/796 |

* cited by examiner

*Primary Examiner* — David Bryant
*Assistant Examiner* — Ruth G Hidalgo-Hernande
(74) *Attorney, Agent, or Firm* — Procopio, Cory, Hargreaves & Savitch LLP

(57) ABSTRACT

A method for modifying a gas turbine injector is disclosed herein. The method for modifying a gas turbine injector includes removing a first tubular member from the gas turbine injector, replacing the first tubular member with a second tubular member, the second tubular member having a center axis and including a circumferential lip extending radially from the center axis, aiming a laser beam at the circumferential lip so that the laser beam forms an acute angle with the center axis, and, laser welding the second tubular member to the gas turbine injector at the acute angle, the laser welding forming a resultant weld between the second tubular member and the gas turbine injector, and such that at least a portion of the circumferential lip is consumed to form at least a portion of the resultant weld.

19 Claims, 5 Drawing Sheets

METHODS FOR MANUFACTURING, MODIFYING, AND RETROFITTING A GAS TURBINE INJECTOR

TECHNICAL FIELD

The present disclosure generally pertains to laser welding, and is more particularly directed toward a laser weld repair of a gas turbine injector at an acute angle.

BACKGROUND

Laser beam welding (LBW) is a welding technique used to join multiple pieces of metal through the use of a laser. The beam provides a concentrated heat source, allowing for narrow, deep welds and high welding rates. The process is frequently used in high volume applications, such as in the automotive industry.

Van Blarigan et al., in U.S. Pat. No. 4,358,658 describe a system for welding a workpiece along a predetermined weld line that may be of irregular shape, which includes the step of forming a lip on the workpiece to extend parallel to the weld line (or axial, relative to the welding rotation axis), and moving the workpiece by engaging the lip between a pair of rotatable members. Rotation of one of the members at a constant speed causes the workpiece to move so that all points on the weld line sequentially pass a fixed point in space at a constant speed, so that a laser welding beam can be directed at that fixed point to form a weld along the weld line. The workpiece can include a reusable jig forming the lip, and with the jig constructed to detachably hold the parts to be welded at a position wherein the weld line of the parts extends parallel to the lip on the jig.

SUMMARY OF THE DISCLOSURE

A method for modifying a gas turbine injector is disclosed herein. The method for modifying a gas turbine injector includes removing a first tubular member from the gas turbine injector, replacing the first tubular member with a second tubular member. The second tubular member has a center axis and includes a circumferential lip extending radially from the center axis. A laser beam is aimed at the circumferential lip at an acute work angle, consuming at least a portion of the circumferential lip with the laser beam, and, laser welding the second tubular member to the gas turbine injector at the acute work angle, forming a resultant weld between the second tubular member to gas turbine injector, and such that the consumed portion of the circumferential lip forms at least a portion of the resultant weld. According to one embodiment, a method for manufacturing a gas turbine injector is disclosed herein. According to another embodiment a method for retrofitting a lean premix gas turbine injector is disclosed herein.

DETAILED DESCRIPTION

Figure 1:
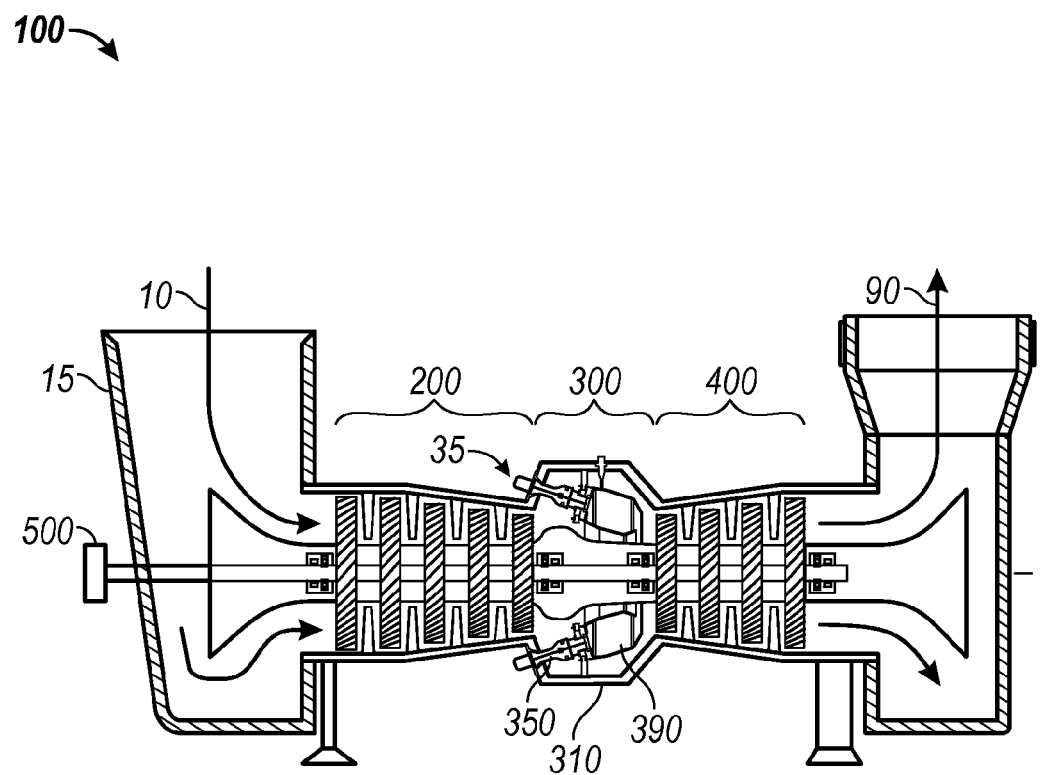
FIG. 1 is a schematic illustration of an exemplary gas turbine engine.

FIG. 1 is a schematic illustration of an exemplary gas turbine engine. Some of the surfaces have been left out (here and in other figures) for clarity and ease of explanation. A gas turbine engine 100 typically includes a compressor 200, a combustor 300, and a turbine 400. Air 10 enters an inlet 15 as a "working fluid", and is compressed by the compressor 200. The combustor 300 may include a combustor case 310, an injector 350, and a combustion chamber 390. Depending on its configuration, the combustor 300 may include one or more of these components. For example, combustor 300 may be configured as a can, annular, or cannular type, depending on the configuration of its combustion chamber(s) 390.

Once the air 10 leaves the compressor 200, it enters the combustor 300, where fuel 35 is then added. Air 10 and fuel 35 are injected into the combustion chamber 390 via injector 350 and ignited. Energy is then extracted from the combusted fuel/air mixture via the turbine 400, and is typically made usable via a power output coupling 500. Exhaust 90 may exit the system or be further processed (e.g., to reduce harmful emissions, and/or to recover heat from the exhaust gas and add it to the compressor outlet air before the air enters the combustion chamber).

The fuel 35 delivered to combustor 300 may include any known type of hydrocarbon based liquid or gaseous fuel. Liquid fuels may include diesel, heating oil, JP5, jet propellant, or kerosene. In some embodiments, liquid fuels may also include natural gas liquids (such as, for example, ethane, propane, butane, etc.), paraffin oil based fuels (such as, JET-A), and gasoline. Gaseous fuels may include natural gas. In some embodiments, the gaseous fuel may also include alternate gaseous fuels such as, for example, liquefied petroleum gas (LPG), ethylene, landfill gas, sewage gas, ammonia, biomass gas, coal gas, refinery waste gas, etc. This listing of liquid and gaseous fuels is not intended to be an exhaustive list but merely exemplary. In general, any liquid or gaseous fuel known in the art may be delivered to combustor 300 through injector 350.

Similarly, one or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

Figure 2:
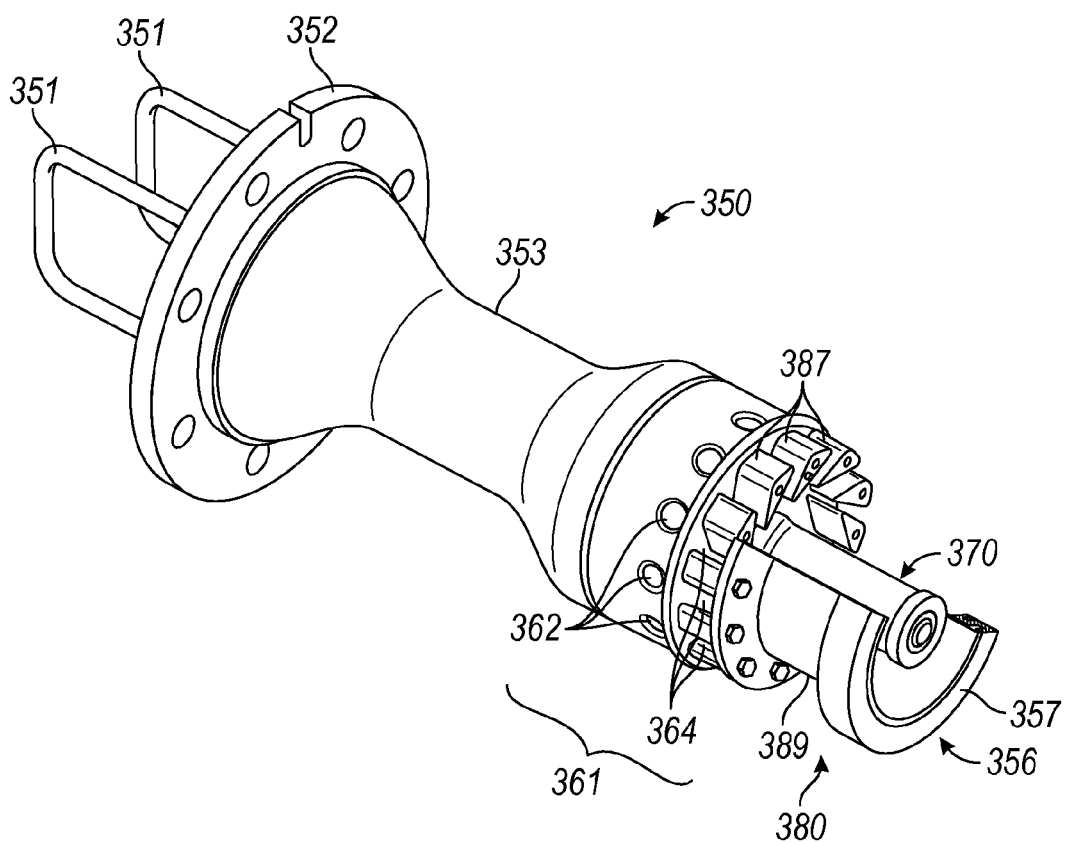
FIG. 2 is an isometric view of an exemplary injector assembly, including a cutaway view of the primary fuel outer premix barrel.

FIG. 2 is an isometric view of an exemplary injector assembly, including a cutaway view of the primary fuel outer premix barrel. In this particular illustration, injector 350 is configured for lean premix combustion ("LPC"), where combustor 300 is configured to provide dry low emissions ("DLE" or SOLONOX—i.e., without adding water to the combustion reaction). Generally, in lean-premix combustors, fuel and air are thoroughly mixed in an initial stage resulting in a uniform, lean, unburned fuel/air mixture which is then injected into a combustion chamber where the combustion reaction takes place. This combustion technique reduces nitrogen oxide (NOx) emissions. Accordingly, here, injector(s) 350 may premix the fuel 35 with the compressed air 10, upstream of the combustion chamber 390, thus providing for improved emissions performance over older combustion techniques, such as diffusion combustion.

As discussed further below, injector 350 may include mounting handles 351, a mounting flange 352, an external flow body 353, an air supply interface 361, a primary fuel assembly 380, a pilot fuel assembly 370 (shown partially exposed and concentric within the outer premix barrel 389), and a combustion chamber interface 356. The air supply interface 361 may include pilot air inlet 362 and primary air inlet 364. The primary fuel assembly 380 may include a plurality of swirler vanes 387 and an outer premix barrel 389 (shown partially cut away and bolted on to the plurality of swirler vanes 387). The combustion chamber interface 356 may include a collar 357.

Figure 3:
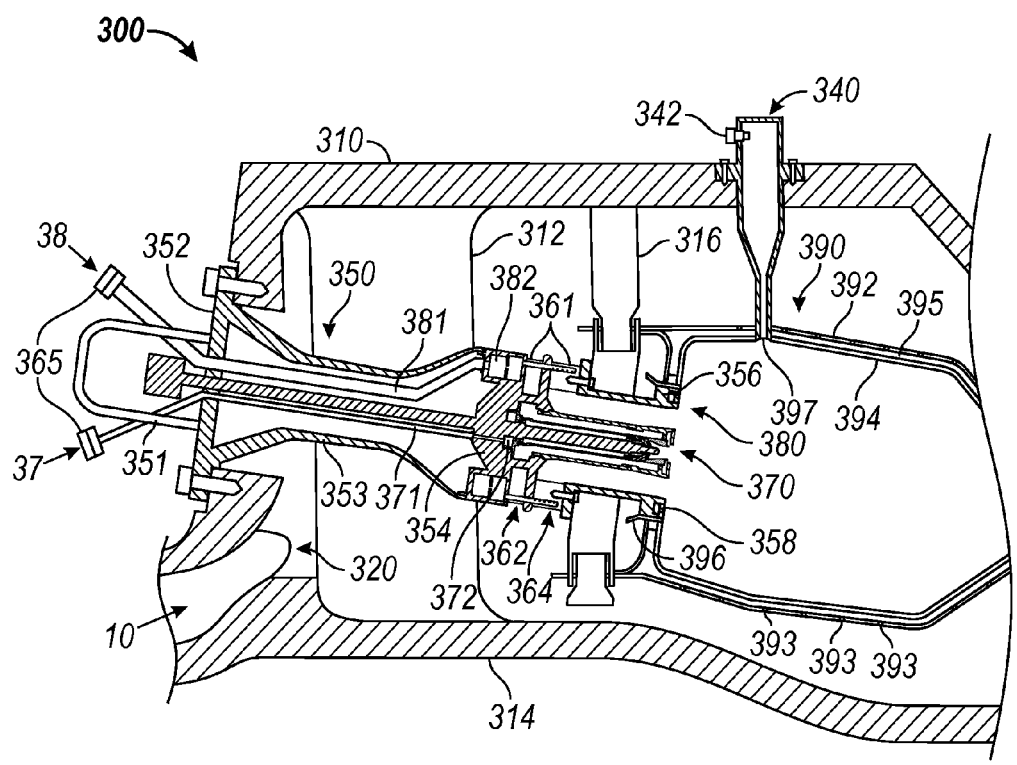
FIG. 3 is a sectional view of an exemplary injector assembly installed in a combustor.

FIG. 3 is a sectional view of the above exemplary injector assembly installed in a combustor. As illustrated here, the combustor 300 may also include a diffuser 320 and an igniter 340. Diffuser 320 delivers compressed air 10 from the compressor 200 to the injector 350, and igniter 340 initiates the combustion process of the fuel 35 and air 10. Here, igniter 340 may be a torch igniter, mounted generally flush with a wall of the combustion chamber 390, and which may include a spark device 342 configured to ignite starter fuel (not shown), providing a starter flame to initiate the combustion reaction. Also, here, the combustor case 310 may be of a "clamshell" configuration (top half partially shown), where combustor 300 may further include a plurality of internal spar supports 312 extending radially between each half of the combustor case 310 and an internal case or "bearing housing" 314.

Focusing on combustion chamber 390, in this particular illustration, combustor 300 may be configured as an annular-type combustor. Thus, combustion chamber 390 may provide a single, annular-type cavity generally encircling the centerline of gas turbine engine 100. Combustion chamber 390 may be pinned to and supported by a plurality of circumferentially disposed radial struts 316. Radial struts 316 may be, in turn, anchored to and extend from the combustor case 310 in a similar circumferential manner.

At start up, and during the combustion process, combustion chamber 390 positions and controls the flame within the combustor 300 and thermally protects surrounding structures. Accordingly, combustion chamber 390 may include an outer shell 392, an inner liner 394, an injector interface 396, and a torch igniter interface 397. Outer shell 392 may include a plurality of cooling air holes 393 configured to pass the surrounding compressed air 10 into a cooling air flow path 395 between the outer shell 392 and the liner 394.

Focusing on injector 350, as illustrated here and above, injector 350 may include a mounting flange 352, an external flow body 353, an internal injector support structure 354, one or more air supply interface(s) 361, one or more fuel supply interface(s) 365, a combustion chamber interface 356, a pilot fuel assembly 370, and a primary fuel assembly 380. Together these components forming injector 350 may receive one or more different types of fuels 35 and compressed air 10, and deliver both pilot fuel 37 and premixed primary fuel 38 to combustion chamber 390. Each of these components may include additional features or functionality. Furthermore, it is understood that manufacturing concerns may require separating or combining one or more components or features (e.g., stacking up braze operations to build a single component or forming a single part that includes one or more features of one or more components).

As illustrated in this exemplary embodiment, both external flow body 353 and internal injector support structure 354 may be integrated or otherwise mechanically coupled to each other and to mounting flange 352, which then mounts the entire injector 350 to the combustor case 310. As mentioned above, one or more features may be included. For example, as illustrated, mounting flange 352 may conveniently include one or more mounting handles 351 for ease of installation and removal of injector 350.

Also, the one or more fuel supply interface(s) 365 may be conveniently located near, and pass through, the mounting flange 352. The one or more fuel supply interface(s) 365 may mechanically couple to one or more one or more fuel supply lines (not shown) of the gas turbine engine 100 using conventional fittings. Fuel supply interface 365 generally receives one or more types of fuel 35 from a fuel supply source of the gas turbine engine 100 for downstream use. Fuel supply interface 365 may be mechanically coupled to one or more fuel flow passages within external air flow body 353 and/or internal injector support structure 354.

Air supply interface(s) 361, may be integrated into the structure of the injector 350 as one or more openings that permit compressed air 10 to enter the injector 350. In particular, according to this exemplary embodiment, internal injector support structure 354 may include a plurality of radial openings to internal passages such that, after air 10 from compressor 200 passes through diffuser 320, and around external flow body 353, it may enter injector 350 via the openings or air supply interface(s) 361. Other injector styles and air supply interface(s) are contemplated as well.

In addition, air supply interface 361 may provide compressed air 10 to injector 350 via segregated paths (e.g., for both the combustion reaction and cooling purposes). As illustrated here, air supply interface 361 may include two arrays of openings circumferentially populating the internal injector support structure 354. In particular, the first array of openings may together form a primary air inlet 364, and the second array of openings may together form a pilot air inlet 362. As such, compressed air 10 may be segregated such that one flow of air 10 (entering injector 350 via primary air inlet 364) may be used as a reactant in the combustion of primary fuel 38, and a second flow of air 10 (entering injector 350 via pilot air inlet 362) may be used both for cooling components or surfaces of injector 350, and as a reactant in the combustion of pilot fuel 37. In alternate embodiments, where a plurality of fuels are used one or both of primary air inlet 364, and pilot air inlet 362 may be used to supply air 10 as a reactant with the additional fuel(s).

Figure 4:
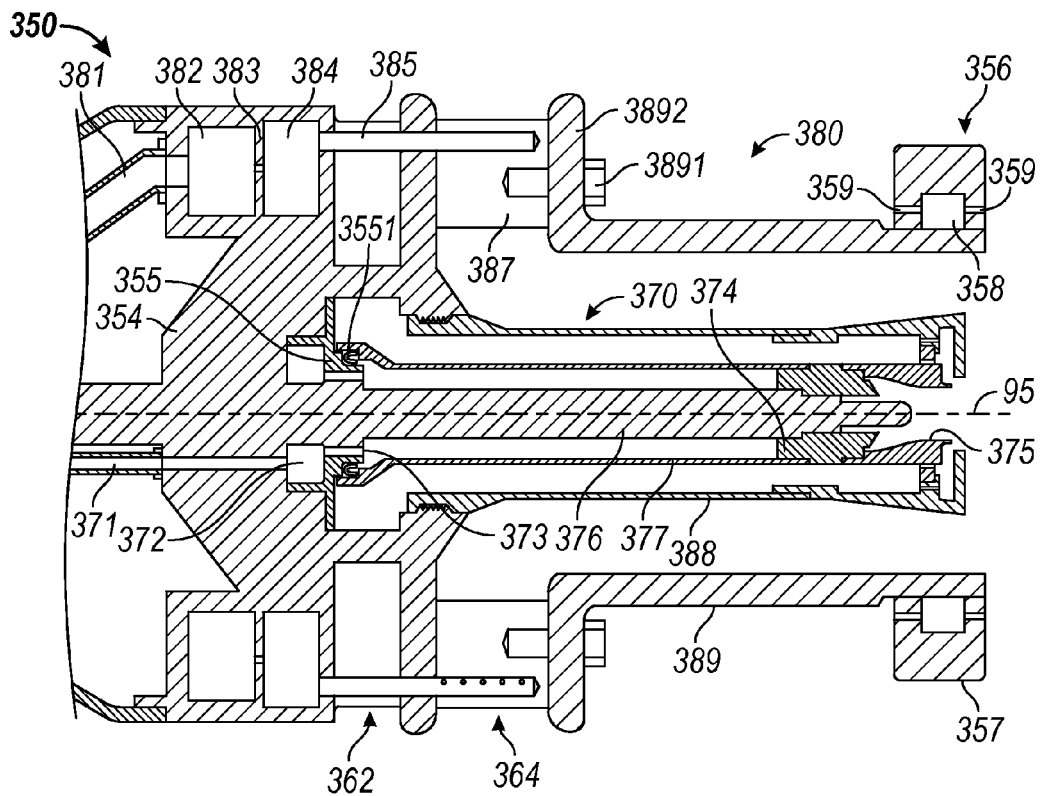
FIG. 4 is a sectional view of a downstream portion of an exemplary injector assembly.

FIG. 4 is a sectional view of a downstream portion of an exemplary injector assembly. At the downstream end, combustion chamber interface 356 mates the injector 350 with the combustion chamber 390. Chamber interface 356 may include one or more portions of primary fuel assembly 380 and pilot fuel assembly 370, at their interface with combustion chamber 390. In particular, combustion chamber interface 356 may include a collar 357 integrated into primary fuel assembly 380, which then slides into the injector interface 396 of the combustion chamber 390 (shown in FIG. 3). Collar 357 may include an annular cavity 358 located therein, and an array of axial holes 359 entering the annular cavity 358 from the opposite sides of the collar 357 (injector side and combustion chamber side). Together, an annular cavity 358 and axial holes 359 may be configured to attenuate acoustic vibrations arising in combustor 300 as a result of instabilities in the combustion process, and thus function as an array of Helmholtz resonators.

Primary fuel assembly 380 and pilot fuel assembly 370 provide two independent fuel paths for fuel 35 to enter the combustion chamber 390. In particular, primary fuel assembly 380 may provide a lean premixed fuel/air mixture to power gas turbine engine 100 while pilot fuel assembly 370 may provide a more stable pilot flame to sustain the primary fuel burn (e.g., through transient conditions). Moreover, pilot fuel assembly 370 may utilize a pilot fuel 37 that is a different fuel of primary fuel 38 or a richer mixture of primary fuel 38, or burn pilot fuel 37 via diffusion flame. Diffusion flames are flames that are created when fuel and air mix and burn at the same time (i.e., in the combustion chamber rather than being premixed). Diffusion flames may have a higher flame temperature than premixed flames, and may serve as a localized hot flame to stabilize the combustion process and prevent lean blowout. Also, in a dual fuel pilot, pilot fuel assembly 370 may be configured to deliver both liquid and gaseous fuel to combustion chamber 390.

Both primary fuel assembly 380 and pilot fuel assembly 370 may receive independent sources of fuel 35 from the one or more fuel supply interface(s) 365, and deliver it to an annular gallery for downstream distribution. Both may also receive independent sources of air 10 from the one or more air supply interface(s) 361, and deliver it to an annular gallery for downstream distribution. From their respective galleries, primary fuel assembly 380 may deliver a premixed fuel-air mixture to combustion chamber 390 while pilot fuel assembly 370 may simultaneously deliver a spray of fuel 35 and air 10 to combustion chamber 390. Here, primary fuel assembly 380 and pilot fuel assembly 370 may be considered to include all the respective fuel/air components between the supply interface 365 and the combustion chamber interface 356.

As illustrated in FIG. 3, primary fuel assembly 380 may begin at fuel supply interface 365, and include a primary fuel flow path 381 that leads up to and enters primary fuel gallery 382. Primary fuel flow path 381 may include any combination of fittings, tubing, and passages in one or more components of injector 350, and be fluidly coupled to primary fuel gallery 382.

Returning to FIG. 4, primary fuel assembly 380 may further include primary fuel gallery 382, a plurality of primary fuel reservoirs 384 and primary fuel distribution plumbing 385. Primary fuel gallery 382 may include an annular passageway machined, or otherwise created, in internal injector support structure 354, and configured to distribute fuel from the primary fuel flow path 381 about the center axis 95 of the injector 350. Primary fuel gallery 382 may be fluidly coupled to primary fuel reservoirs 384 via drill holes. Primary fuel reservoirs 384 may include individual cavities machined, or otherwise created, in internal injector support structure 354. Primary fuel reservoirs 384 may be fluidly coupled to primary fuel distribution plumbing 385.

At primary air inlet 364, primary fuel assembly 380 may further include a plurality of swirler vanes 387, an inner premix tube 388, an outer premix barrel 389, and terminate at the combustion chamber interface 356. Each swirler vane 387 may include a straight or curved blade configured to swirl the incoming compressed air 10 about the center axis 95 of the injector 350 as it enters the primary air inlet 364. Each swirler vane 387 may form part of, or otherwise be mechanically attached to internal injector support structure 354. The number of swirler vanes 387 in injector 350 may depend upon the specific characteristics of gas turbine engine 100. Although swirler vanes 387 are illustrated as part of a radial swirler, injector 350 in general, may include a radial or an axial swirler. A radial swirler is an air swirler in which compressed air 10 from compressor 200 may be directed to the curved blades radially, while an axial swirler is an air swirler in which the compressed air 10 may be directed to the curved blades axially.

In addition, inner premix tube 388 and outer premix barrel 389 may include concentric tubes that together form a passageway for primary 38 fuel to mix with air 10 and to reach the combustion chamber 390. Moreover, outer premix barrel 389 may be made to include a circumferential radial flange 3892 configured to bolt on, or otherwise be removable from the swirler vanes 387. In this way outer premix barrel 389 and internal injector support structure 354 may form a radial passageway between swirler vanes 387 for primary fuel 38 and air 20. Also, outer premix barrel 389 may be readily removed for access to inner premix tube 388 and other components of injector 350.

As illustrated in FIG. 3, pilot fuel assembly 370 may start on the left at fuel supply interface 365, and include a pilot fuel flow path 371, that leads up to and enters pilot fuel gallery 372. Pilot fuel flow path 371 may include any combination of fittings, tubing, and passages in one or more components of injector 350, and be fluidly coupled to pilot fuel gallery 372.

Returning to FIG. 4, after reaching pilot fuel gallery 372, pilot fuel assembly 370 may also include pilot fuel gallery 372. Pilot fuel gallery 372 may include an annular passageway machined, or otherwise created, in internal injector support structure 354, and configured to distribute fuel from the pilot fuel flow path 371 around the center axis 95 of the injector 350. Pilot fuel gallery 372 may be fluidly coupled to pilot fuel distribution plumbing 373. Pilot fuel distribution plumbing 373 may also include an annular array of ports cut into internal injector support structure 354 and configured to fluidly couple pilot fuel gallery 372 with the annular passageway formed between air assist shroud 376 and pilot shroud 377.

Pilot fuel assembly 370 may further include pilot fuel distribution plumbing 373, a premix tip assembly 374, and a pilot spray nozzle 375. Pilot fuel distribution plumbing 373 may include air assist shroud 376 and pilot shroud 377. Air assist shroud 376 and pilot shroud 377 are generally concentric, with substantially tubular pilot shroud 377 circumferentially disposed around a pilot assembly air assist shroud 376. Premix tip assembly 374 may terminate the passageway formed between air assist shroud 376 and pilot shroud 377, but may include plurality of pilot fuel egress holes.

At pilot air inlet 362, pilot fuel assembly 370 may further include a plurality of radial air passages 363 made through internal injector support structure 354, an annular air passageway made between the outer surface of pilot shroud 377 and the inner surface of inner premix tube 388 (i.e., pilot shroud 377 and the inner premix tube 388 are generally concentric tubes). In this configuration, compressed air 10 can enter pilot air inlet 362, travel through one of the plurality of air passages 363, turn from a radial direction to an axial direction into the passageway between pilot shroud 377 and inner premix tube 388, pass thorough the air egress holes 3741 of premix tip assembly 374, on though pilot spray nozzle 375, and into combustion chamber 390 for combustion. Although pilot air inlet 362 and air passages 363, are oriented radially, it is understood an axial inlet may be used as well.

As illustrated, some pre-mixing of air 10 and pilot fuel 37 may take place at and around the downstream tip of the air assist shroud 378 and in the pilot spray nozzle 375. According to one alternate embodiment, pilot fuel assembly 370 may utilize a swirler, as above, and/or mix the air 10 and pilot fuel 37 earlier, providing for more fully pre-mixed fuel-air mixture.

As mentioned above, one or more components may be compound and/or combined. Accordingly, for manufacturability, internal injector support structure 354 may be bifurcated such that one portion contains the primary fuel gallery 382 and the other portion contains the series of primary fuel reservoirs 384. Primary fuel gallery 382 may be an annular passage cut into the internal injector support structure 354, and primary fuel reservoirs 384 may include several independent cavities cut into the internal injector support structure 354. A perforated baffle plate 383 may then be placed between the two portions, and the internal injector support structure 354 may be reassembled using conventional joining methods, such as brazing. Similarly, primary fuel distribution plumbing 385 may be integrated into individual swirler vanes 387, and the swirler vanes 387 may be integrated into internal injector support structure 354.

Functionally, primary fuel assembly 380 generally lean-premixes primary fuel 37 with compressed air 10 for downstream combustion in the combustor. As air 10 enters primary fuel assembly 380 it impinges on the plurality of swirler vanes 387. Liquid and or gaseous fuel may be injected into the swirled air stream to mix with the compressed air 10. Swirling the compressed air may help mix the fuel thoroughly with the compressed air. The premixed air-fuel mixture may be directed to combustion chamber 390 through the passageway formed between inner premix tube 388 and outer premix barrel 389. Premixing the fuel before combustion may lower the combustion temperature and lower NOx emissions; however, it may also result in a less stable flame. Pilot fuel assembly 370 may then be used to provide a persistent, stable flame, for example by providing a richer fuel/air mixture or a diffusion flame.

Figure 5:
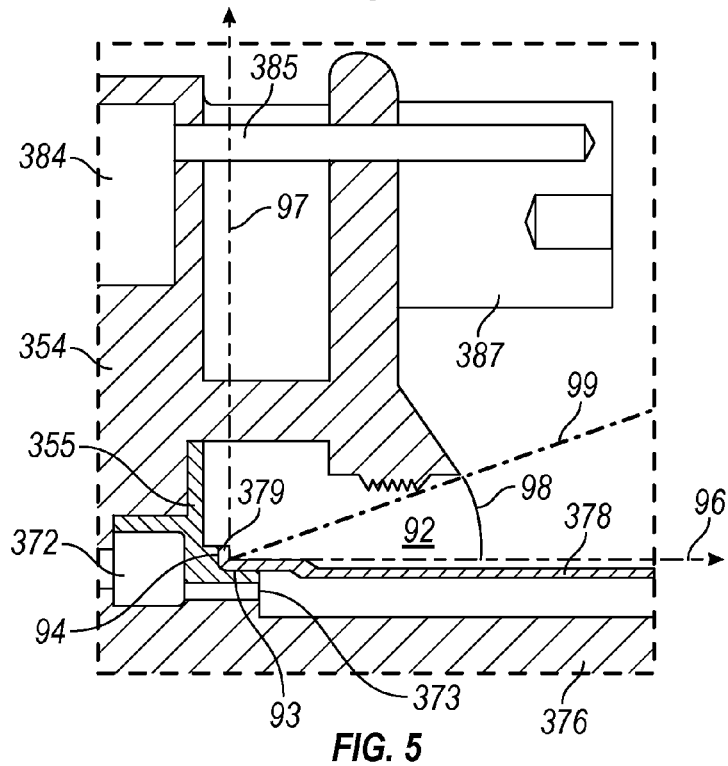
FIG. 5 is a sectional view of a downstream portion of an exemplary injector assembly showing an angled laser weld of a modified replacement part.

FIG. 5 is a sectional view of a downstream portion of an exemplary injector assembly showing an angled laser weld of a modified replacement part. Here the replacement part, being a tubular structure, will receive a continuous circumferential weld around center axis 95. The direction of the weld is into the page and perpendicular to center axis 95.

Conventional laser welding is performed using an automated laser welder, with the laser beam angle greatly affecting the shape of the weld. The laser beam weld angle consists of two components: travel angle and work angle. "Travel angle" is an angle in the direction of welding and may be described as the "pulling" or "pushing" of the weld. The travel angle may generally vary from 5 to 30 degrees from perpendicular (i.e., vertical axis 97) to weld formed. The "travel angle" is not shown here as it is out-of-plane.

"Work angle" is an angle perpendicular to the direction of welding and may be described as the "sideways tilt" of the laser welder. The work angle may be measured from the horizontal axis 96 or the vertical axis 97. Here, work angle 98 is described as the in-plane weld angle component measured between laser beam 99 and the horizontal axis 96 of the figure.

With regard to the work angle 96, generally, laser welding is performed at substantially a right angle to the weld (i.e., work angle 96≈90 deg). While, a small variance of the work angle from perpendicular to the workpiece might not affect the appearance or quality of a weld, significant departures from perpendicular (e.g., greater than 45 degrees) may result in undercuts (which could create stress risers or a weaker joint).

As part of a repair, overhaul, improvement, maintenance, or other activity modifying a gas turbine component such as injector 350, non-removable pilot shroud 378 may be fabricated with consumable lip 379 extending radially from its otherwise axial tubular form. Other geometries are contemplated, which may consider effects on local air or fuel flows, or interchangeability with other preexisting component designs. For example, consumable lip 379 may be shaped or include additional features so as to maintain a predetermined flow profile (e.g. laminar, turbulent, rotational, etc.) once non-removable pilot shroud 378 has been laser welded to injector 350.

As above, in order to disassemble/access portions of pilot fuel assembly 370, at least one concentric tubular member encircling portions of pilot fuel assembly 370 may be removed from gas turbine injector 350. For example, outer premix barrel 389 may be unfastened from internal injector support structure 354 and removed, inner premix tube 388, may be unthreaded from internal injector support structure 354 and removed, and pilot shroud 377 may be pulled from pilot interface 355 and removed (along with any sealing members such as c-seal 3551).

New non-removable pilot shroud 378 may be temporarily installed or placed on injector 350, which may then be installed in a welding tool (not shown). In particular, non-removable pilot shroud 378 may be positioned generally flush onto pilot interface 355 and such that laser beam 99 will impinge on consumable lip 379 before reaching pilot interface 355. To illustrate, non-removable pilot shroud 378 may be slid over the pilot interface 355 such that the inner surface of non-removable pilot shroud 378 contacts pilot interface 355 radially at a radial interface 93, and the consumable lip 379 of non-removable pilot shroud 378 contacts pilot interface 355 axially at an axial interface 94.

Partially assembled injector 350 may then be installed in a rotational tool of an automated laser welder (not shown) for laser welding. As such, the automated laser welder may be preprogrammed with an angular velocity and laser beam profile associated with a desired weld profile.

The laser welder may then be configured to aim laser beam 99 at the consumable lip 379 through the rotational tool, into the injector cavity 92, and at an acute work angle 98. In other words, laser beam 99 forms an acute work angle with horizontal axis 96 or center axis 95 (i.e., the extrapolation of laser beam 99 on to center axis 95). Moreover, acute work angle 98 may be significantly less than perpendicular (e.g., greater than 45 degrees work angle 98). For example, as shown, acute work angle 98 may be 30 degrees or more, measured from center axis 95.

As indicated above, laser beam 99 will impinge on consumable lip 379 before reaching pilot interface 355. Accordingly, during laser welding, at least a portion of consumable lip 379 may be consumed to form the weld before a portion of pilot interface 355, and will be included in the resultant weld. Similarly, consumable lip 379 may be consumed before the "non-lip" portions of non-removable pilot shroud 378.

The laser welding operation may further include circum-navigating the laser beam 99 around center axis 95 so as to form a continuous weld between the non-removable pilot shroud 378 and pilot interface 355 of injector 350. Circum-navigating the laser beam 99 may include moving the laser beam 99, turning the part via the rotational tool, or any combination thereof.

The laser welding operation may then form a resultant weld between the non-removable pilot shroud 378 and pilot interface 355 of injector 350, and such that the consumed portion of the consumable lip 379 forms at least a portion of the resultant weld. The addition of consumable lip 379 may provide for the laser welding to basically result in a butt weld (axial joint relative to center axis 95) at the axial interface 94, which began to some degree as a lap weld, while leaving radial interface 93 free of weld joining. Thus, being free of welding, the wall thickness of non-removable pilot shroud 378 may remain substantially consistent at interface 93.

Upon completion of the circumferential weld at the base of non-removable pilot shroud 378, an "air-tight" seal may be formed between the non-removable pilot shroud 378 and pilot interface 355 of injector 350. The resultant weld profile may be designed to vary the degree of "air tightness". In particular, non-removable pilot shroud 378 may be designed as part of an air, gaseous fuel, or liquid fuel passageway, with each having its own leakage, yield, burst, and other requirements. Accordingly, once the welding operations are completed, the non-removable pilot shroud 378 may be submitted to testing (e.g., pressure tested for any leakage). The remaining injector components (e.g., outer premix barrel 389 and inner premix tube 388) may be reassembled in the reverse order in which they were removed.

While the disclosed method has been directed toward modifying or retrofitting injector 350, one or more steps may be applied to the manufacture of injector 350 as well. For example, as discussed above complex parts such as injector 350 may involve stacking up braze operations to build the part assemblies. Manufacturing concerns may make it desirable in some instances to install a non-removable pilot shroud 378 after pilot interface 355 been installed into cavity 92. It is understood that non-removable pilot shroud 378 may be laser welded in substantially the same manner and overcoming the same obstacles described above for modifying the injector 350.

Figure 6:
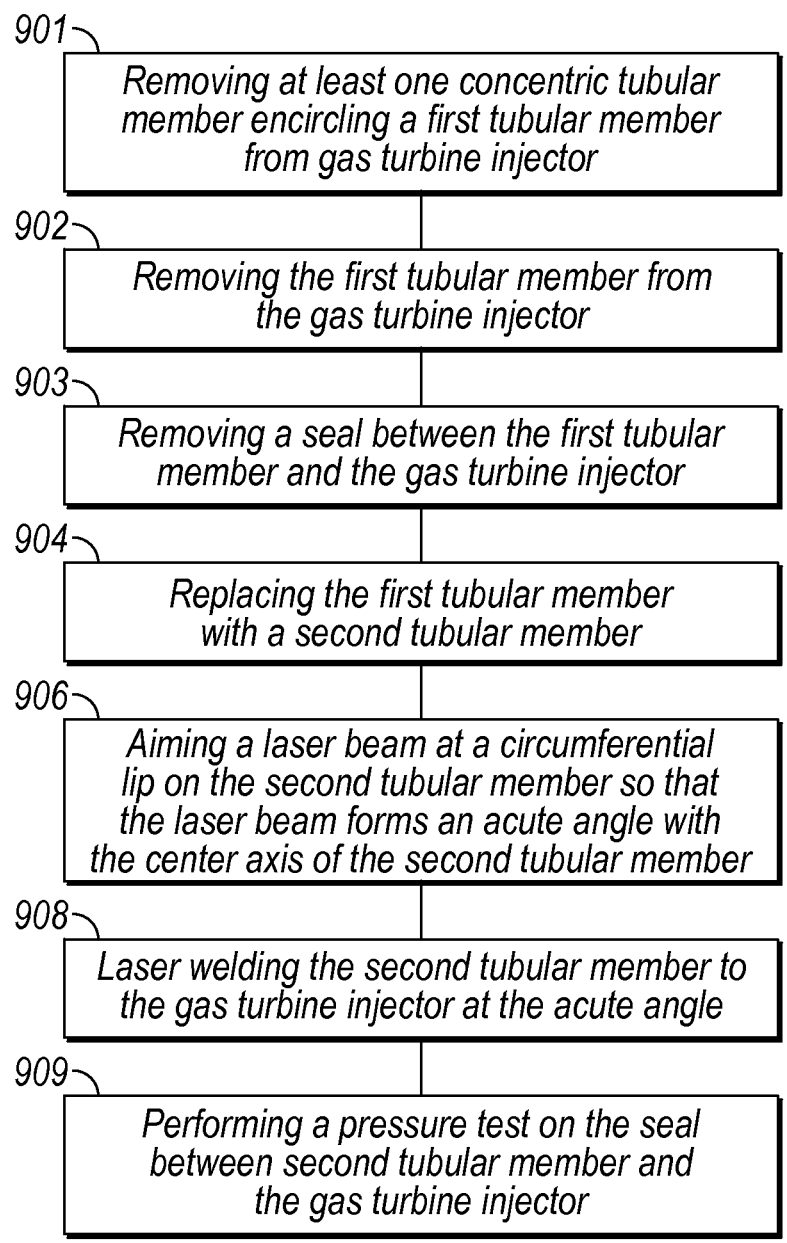
FIG. 6 is a flow chart of an exemplary method for modifying a gas turbine injector.

FIG. 6 is a flow chart of an exemplary method for modifying a gas turbine injector. In particular, a gas turbine injector may be modified, retrofitted, or manufactured as described above using the following steps, the above description, or a combination thereof. To illustrate, gas turbine injector may be modified by removing at least one concentric tubular member encircling (e.g., outer premix barrel 389) a first tubular member (e.g., pilot shroud 377) from gas turbine injector 901, then removing the first tubular member from the gas turbine injector 902 and also removing a seal between the first tubular member and the gas turbine injector 903. After the parts are removed. The method may continue with replacing the first tubular member with a second tubular member (e.g., non-removable pilot shroud 378) 904, aiming a laser beam at a circumferential lip on the second tubular member so that the laser beam forms an acute angle with the center axis of the second tubular member 906, then laser welding the second tubular member to the gas turbine injector at the acute angle 908. According to an alternate embodiment, the method may include performing a pressure test on the seal between second tubular member and the gas turbine injector 909.

INDUSTRIAL APPLICABILITY

The present disclosure generally provides a method for modifying and manufacturing a gas turbine injector. The gas turbine injector is particularly suited for lean premix combustion wherein at least a primary fuel supply and a pilot fuel supply are individually provided to a gas turbine combustor.

For ease of maintenance/repair/overhaul/inspection and/or access to concentric components, one or more components may be made removable. In particular, outer premix barrel 389 may be removable from the internal injector support structure 354 via swirler vanes 387 (e.g., using fasteners such as bolts 3891), inner premix tube 388 may be threaded into internal injector support structure 354, and pilot shroud 377 may be pressed onto a mating pilot interface 355 of internal injector support structure 354 with one or more sealing members between (e.g., a c-seal 3551 may be included that may be compressed to form a seal between the mating components). Also, c-seal 3551 may be made of any material, such as, for example, Inconel 718.

Accordingly, in order to access/disassemble portions of pilot fuel assembly 370, outer premix barrel 389 may be unfastened from internal injector support structure 354 and removed, inner premix tube 388, may be unthreaded from internal injector support structure 354 and removed, and pilot shroud 377 may be pulled from pilot interface 355 (e.g., breaking any press fit) and removed (along with any sealing members such as c-seal 3551). In addition, after removal of one or more parts of injector 350, it may be desirable to replace them with new parts. For example, pilot shroud 377 may be replaced as part of a repair, overhaul, improvement, or maintenance (e.g., as a preventative measure). New parts may be installed in the reverse order in which they were removed. Alternately, new parts may be installed in view of modified features, and/or the injector being partially or completely assembled.

According to one embodiment of the disclosure, injector 350 may be modified by replacing certain removable parts with non-removable parts. In particular, a first tubular member such as pilot shroud 377 may be replaced with a second tubular member such as non-removable pilot shroud 378 (shown in FIG. 5). Here, non-removable pilot shroud 378 may be welded onto pilot interface 355 of internal injector support structure 354 with only partial disassembly of injector 350. By welding non-removable pilot shroud 378 to an already in-service injector 350, a positive seal may be created, despite wearing that might be present, and may possibly extend the life of injector 350 over that with a replacement using a removable pilot shroud 377. Non-removable pilot shroud 378 may be made from a superalloy.

As applied here, in thin-walled members, such as tubes (e.g., pilot shroud 377 and non-removable pilot shroud 378), there is limited tolerance for undercuts. Accordingly, during an initial build of injector 350, non-removable pilot shroud 378 could conveniently be laser welded onto pilot interface 355, while held in isolation, and without obstructions. In particular, non-removable pilot shroud 378 could be laser welded onto pilot interface 355 with ideal weld and travel angles for the particular geometry, or even orthogonal to the weld. The combination could then be brazed into internal injector support structure 354 at a later build stage.

However, once injector 350 is built, even with it being partially disassembled (as shown), laser welding becomes a challenge. In particular, given that the weld location is recessed within cavity 92, there is no clear path for laser beam 99 to weld non-removable pilot shroud 378 without significantly departing from perpendicular, much less at the 90 degree work angle. This then necessitates the prior removal of pilot interface 355 from internal injector support structure 354 (i.e., removing the braze joint). Moreover, this removal would require an additional brazing operation of the pilot interface 355 back into the internal injector support structure 354 upon completion of the weld, possibly affecting other braze welds of the injector.

Alternately, to weld non-removable pilot shroud 378 without further disassembly then shown, laser beam 99 must enter cavity 92 at a work angle significantly departing from perpendicular (here, approximately 30 degrees from horizontal axis 96 for an axial butt joint) in order to avoid obstructing portions of the partially assembled injector 350. Moreover, the termination of laser beam 99 must be moved around the pilot interface 355 in a plane perpendicular to the figure (i.e., the plane formed by center axis 95 and vertical axis 97). Thus, unlike welding as part of an initial build process of injector 350, here, substantial additional disassembly (e.g., braze removal) may otherwise be required for the additional access needed.

By introducing a circumferential lip ("consumable lip") 379, to non-removable pilot shroud 378, laser welding is possible at an irregular angle such as the above-mentioned work angle 98. According to one embodiment of the disclosure, a replacement part may be modified to include "functional" features associated with its installation. In particular, a portion of the replacement part may be "consumed" during installation/welding. For example, as illustrated, non-removable pilot shroud 378 may include a consumable lip 379 extending radially from its axial tube section. Accordingly, by introducing consumable lip 379 to non-removable pilot shroud 378 of injector 350, an acute laser weld is possible here without otherwise undercutting pilot interface 355 of internal injector support structure 354 in the process. This is particularly beneficial as pilot interface 355 may include internal passages and have limited consumable thickness.

The disclosed methods for modifying, manufacturing, and retrofitting a gas turbine injector is generally applicable to any gas turbine injector requiring welding in region where a perpendicular work angle is not available or desirable. Additionally, the disclosed methods for modifying, manufacturing, and retrofitting a gas turbine injector are particularly applicable to the use, operation, maintenance, repair, and improvement of gas turbine engines. Specifically, the methods may be suited for the design, manufacture, test, repair, overhaul, and improvement of gas turbine injectors and other components. As applied, gas turbine engines, and thus the components thereof, may be suited for any number of industrial applications, such as, but not limited to, various aspects of the oil and natural gas industry (including include transmission, gathering, storage, withdrawal, and lifting of oil and natural gas), power generation industry, aerospace and transportation industry, to name a few examples.

In order to improve efficiency, decrease maintenance, and lower costs, embodiments of the presently disclosed methods for manufacturing, modifying, and/or retrofitting a gas turbine injector may be used on injectors or other gas turbine components at any stage of the gas turbine component's life, from first manufacture and prototyping to end of life. In addition, the methods for manufacturing, modifying, and/or retrofitting a gas turbine injector may be used in response to an event, as a preventative measure, or as an enhancement to an existing gas turbine engine component. For example, by welding a non-removable pilot shroud to an already in-service injector, as described above, a positive seal may be created, possibly extending the life of injector over a replacement using another removable pilot shroud.

Although this invention has been shown and described with respect to a detailed embodiment thereof, it will be understood by those skilled in the art that various changes in form and detail thereof may be made without departing from the spirit and scope of the claimed invention. Accordingly, the preceding detailed description is merely exemplary in nature and is not intended to limit the invention or the application and uses of the invention. The described embodiments are not limited to use in conjunction with a particular type of gas turbine engine, or a gas turbine engine (or component) at all. Hence, although the present embodiments are, for convenience of explanation, depicted and described as being implemented in the manufacturing, modifying, and/or retrofitting a gas turbine injector, it will be appreciated that it can be implemented in various other types of components, turbines, and in various other systems and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A method for modifying a gas turbine injector, the method comprising:
    removing a first tubular member from the gas turbine injector;
    replacing the first tubular member with a second tubular member, the second tubular member having a tube section having a center axis and a circumferential lip extending radially outward from an end of the tube section relative to the center axis;
    locating the second tubular member so that an inner surface of the tube section contacts a pilot interface of the gas turbine injector forming a radial interface and the circumferential lip abuts the pilot interface forming an axial interface;
    aiming a laser beam at an outer surface of the circumferential lip opposite the axial interface so that the laser beam forms an acute angle with the center axis; and
    laser welding the second tubular member to the gas turbine injector at the acute angle, the laser welding forming a resultant weld at the axial interface between the circumferential lip and the pilot interface, and such that at least a portion of the circumferential lip is consumed to form at least a portion of the resultant weld.

2. The method of claim 1, wherein the removing the first tubular member from the gas turbine injector includes breaking a press fit between the first tubular member and the pilot interface, the method further comprising removing a seal between the first tubular member and the pilot interface.

3. The method of claim 1, wherein the replacing the first tubular member with the second tubular member, includes sliding the second tubular member over a concentric portion of the pilot interface until circumferential lip abuts the pilot interface.

4. The method of claim 1, wherein the acute angle is less than 45 degrees.

5. The method of claim 1, wherein the at least the portion of the circumferential lip is consumed before any portion of the gas turbine injector is included in the resultant weld, and before any portion of the tube section is included in the resultant weld.

6. The method of claim 1, wherein the laser welding the second tubular member to the gas turbine injector includes circumnavigating the laser beam around center axis so as to form a continuous weld between the second tubular member and the gas turbine injector.

7. The method of claim 1, wherein the laser welding the second tubular member to the gas turbine injector includes forming an air-tight seal between the second tubular member and the gas turbine injector.

8. The method of claim 7, further comprising performing a pressure test on the seal between second tubular member and the gas turbine injector.

9. The method of claim 1, wherein the second tubular member is a pilot shroud, the method further comprising removing at least one concentric tubular member encircling the first tubular member from the gas turbine injector.

10. The method of claim 1, wherein the acute angle is between 45 degrees and 30 degrees.

11. A method for assembling a gas turbine injector, the gas turbine injector including a pilot interface with a concentric portion having a center axis and a cylindrical shape, the concentric portion recessed within a cavity and configured to concentrically interface with a tubular member relative to the center axis, the method comprising:

forming a circumferential lip in the tubular member, the circumferential lip extending radially outward from the tubular member relative to the center axis;

sliding the tubular member over the concentric portion of the gas turbine injector such that an inner surface of the tubular member contacts the concentric portion radially at a radial interface, and the circumferential lip of the tubular member further abuts the pilot interface axially at an axial interface;

aiming a laser beam at a point on the circumferential lip so that the laser beam and the central axis form an acute angle; and laser welding the tubular member to the gas turbine injector at the acute angle, the laser welding forming a resultant weld between the circumferential lip and the pilot interface at the axial interface, and such that at least a portion of the circumferential lip is consumed to form at least a portion of the resultant weld.

12. The method of claim 11, wherein the acute angle is less than 45 degrees.

13. The method of claim 11, wherein the laser welding the tubular member to the gas turbine injector includes forming the resultant weld at the axial interface, and maintaining the radial interface between the tubular member and the concentric portion free of weld joining.

14. The method of claim 11, wherein the laser welding the tubular member to the gas turbine injector includes circumnavigating the laser beam around center axis so as to form a continuous weld between the tubular member and the gas turbine injector.

15. The method of claim 11, wherein the laser welding the tubular member to the gas turbine injector includes forming an air-tight seal between the tubular member and the gas turbine injector, the method further comprising performing a pressure test on the air-tight seal between the tubular member and the gas turbine injector.

16. A method for retrofitting a lean premix gas turbine injector, the method comprising:

removing the gas turbine injector from a gas turbine engine; removing a first tubular member from the gas turbine injector;

replacing the first tubular member with a second tubular member, the second tubular member having a center axis and including a tube section and a circumferential lip extending radially outward from the tube section away from the center axis;

sliding the second tubular member over a concentric portion of the gas turbine engine injector so that an inner surface of the tube section contacts the concentric portion forming a radial interface and the circumferential lip abuts the gas turbine injector forming an axial interface;

aiming a laser beam at a point on the circumferential lip opposite the axial interface so that the laser beam forms an acute angle with the center axis; and laser welding the second tubular member to the gas turbine injector at the acute angle, the laser welding forming a resultant axial weld between circumferential lip and the gas turbine injector, and such that at least a portion of the circumferential lip is consumed to form at least a portion of the resultant axial weld.

17. The method of claim 16, wherein the removing the first tubular member from the gas turbine injector includes breaking a press fit between the first tubular member and gas turbine injector, the method further comprising removing a seal from between the first tubular member and the gas turbine injector.

18. The method of claim 16, wherein the acute angle is less than 45 degrees.

19. The method of claim 16, wherein the laser welding the second tubular member to the gas turbine injector further includes maintaining the radial interface, the tube section and the concentric portion free of weld joining.

* * * * *